United States Patent [19]

Barsacq

[11] Patent Number: 4,721,516
[45] Date of Patent: Jan. 26, 1988

[54] CENTRAL VACUUM CLEANING INSTALLATION WITH WATER FLUSHING

[75] Inventor: Gabriel Barsacq, Biarritz, France

[73] Assignee: Aspiramatic (Societe a Responsabilite Limtee), France

[21] Appl. No.: 829,027

[22] Filed: Feb. 13, 1986

[30] Foreign Application Priority Data

Jan. 17, 1986 [FR] France .................. 86 00731

[51] Int. Cl.⁴ .............................................. B01D 47/02
[52] U.S. Cl. ......................... 55/218; 15/301; 15/319; 15/353; 55/227; 55/242; 55/256; 55/271; 55/274; 55/431; 55/472; 55/DIG. 8
[58] Field of Search ............... 55/218, 227, 242, 255, 55/256, 271, 274, 431, 472, DIG. 8; 15/301, 319, 353

[56] References Cited

U.S. PATENT DOCUMENTS

| | | | |
|---|---|---|---|
| 1,806,049 | 5/1931 | Ennis et al. | 55/255 X |
| 1,866,443 | 7/1932 | Zumbro | 55/255 X |
| 2,191,717 | 2/1940 | Jeffery | 15/353 X |
| 2,405,494 | 8/1946 | Dupuy | 55/255 X |
| 2,825,921 | 3/1958 | Wright | 55/DIG. 8 X |
| 2,862,354 | 12/1958 | Barnhart | 55/227 X |
| 3,048,875 | 8/1962 | Bottinelli et al. | 55/DIG. 8 X |
| 3,173,164 | 3/1965 | Congdon | 15/319 X |
| 3,318,075 | 5/1967 | Wilson | 55/242 X |
| 4,121,915 | 10/1978 | Anderson | 55/271 X |
| 4,553,991 | 11/1985 | Barsacq | 55/218 |

FOREIGN PATENT DOCUMENTS 324474 8/1920 Fed. Rep. of Germany ........ 55/227
1401333 7/1975 United Kingdom .

Primary Examiner—Kathleen J. Prunner
Attorney, Agent, or Firm—Robert J. Koch

[57] ABSTRACT

The invention concerns a central vacuum cleaning system for vacuum cleaning ducts permanently installed in buildings. The device has three connected sections which form the integral unit. The top section contains the suction turbine, its motor and an exhaust outlet for clean air. The center section contains air baffles, a perforated circular conduit below the air baffles and for dispersing water, an angled inlet conduit for dust-laden air, and a water level sensor. The bottom section contains a water outlet, a flexible sleeve valve, the outlet end of the angled inlet conduit from the center section, a water reservoir with a water level above the outlet end of the inlet conduit and substantially even with the water outlet, and a drain plug. Dust-laden air bubbles through water in the reservoir. The dust-containing water is automatically flushed by electronic control circuitry coordinating the filling and evacuation sequence.

10 Claims, 3 Drawing Figures

CENTRAL VACUUM CLEANING INSTALLATION WITH WATER FLUSHING

BACKGROUND OF THE INVENTION

The present invention concerns a central vacuum cleaning installation with water flushing.

An installation of this type is known in particular from U.S. Pat. No. 4,553,991 (Fr.-A No. 83 09710) by the present applicant.

This references describes a vacuum cleaning system comprising a central suction device in communication with a network of permanent ducts having suction orifices and placed on the premises or parts of a residential building or the like. The system includes means to remove dust from the air suctioned in and to dispose of the dust intercepted such that the dust removal and disposal means comprise a first enclosure connected at its upper part with said central suction device and at its lower part with a network of permanent ducts. Additionally, the system contains an exhaust duct and a reservoir of water (designed the wash water) in the lower part of the enclosure and of a level flush with the orifice of said exhaust duct. The permanent ducts open into the enclosure through an angled inlet conduit (a bubbling bend) whose terminus is in said water reservoir. An external source of water connects with the enclosure through parallel two-way valve means and three-way valve means, e.g., solenoids, placed into the conduit of said water. The valves are electrically connected with a control switch.

It is the object of the present invention to improve the process of water flushing such devices, while simplifying the apparatus and rendering it more compact.

SUMMARY OF THE INVENTION

For this purpose, the invention has as its object a central vacuum cleaning system comprising a central suction device means connected by a network of permanent ducts with suction orifices placed on the premises or in parts of residential buildings or the like. The system has means for removing dust from the air suctioned in and fluid outlet means to dispose of the dust intercepted. The system enclosure is connected with said central suction device and, at its lower part, an exhaust duct containing the fluid outlet and valve means, and a flexible sleeve gate valve. A water reservoir (designated the wash water) is within the lower part of the enclosure and has a water level substantially equal to the opening height of said fluid outlet means. The permanent ducts open into the enclosure through an angled conduit terminating below the surface of the water in said water reservoir. The system also contains means to generate a flushing effect in said enclosure, said flushing means comprising:

a three-way valve means placed in a conduit of water under pressure connected to said flexible sleeve;
  a two-way solenoid valve mounted in parallel with the three-way valve and supplying water to a perforated annular conduit placed inside said enclosure, and
  time delay control circuit means connected to said valves for actuating the cycle of:
   closing the flexible sleeve valve;
   filling the enclosure for an adjustable, predetermined period of time; and
   opening said flexible sleeve valve.

According to a further characteristic of the invention, said enclosure is directly connected at its upper part with the central suction device which forms an integral part of the body defining said enclosure.

In this manner, a particularly efficient, simple, compact installation is obtained which may be manufactured and operated at low cost.

BRIEF DESCRIPTION OF THE DRAWINGS

Further characteristics and advantages will become apparent from the description hereinbelow of a mode of embodiment of the installation according to the invention, the description being presented solely as an example with reference to the drawings attached hereto, wherein.

DETAILED DESCRIPTION OF THE PREFERRED EMBODIMENT

Figure 1:
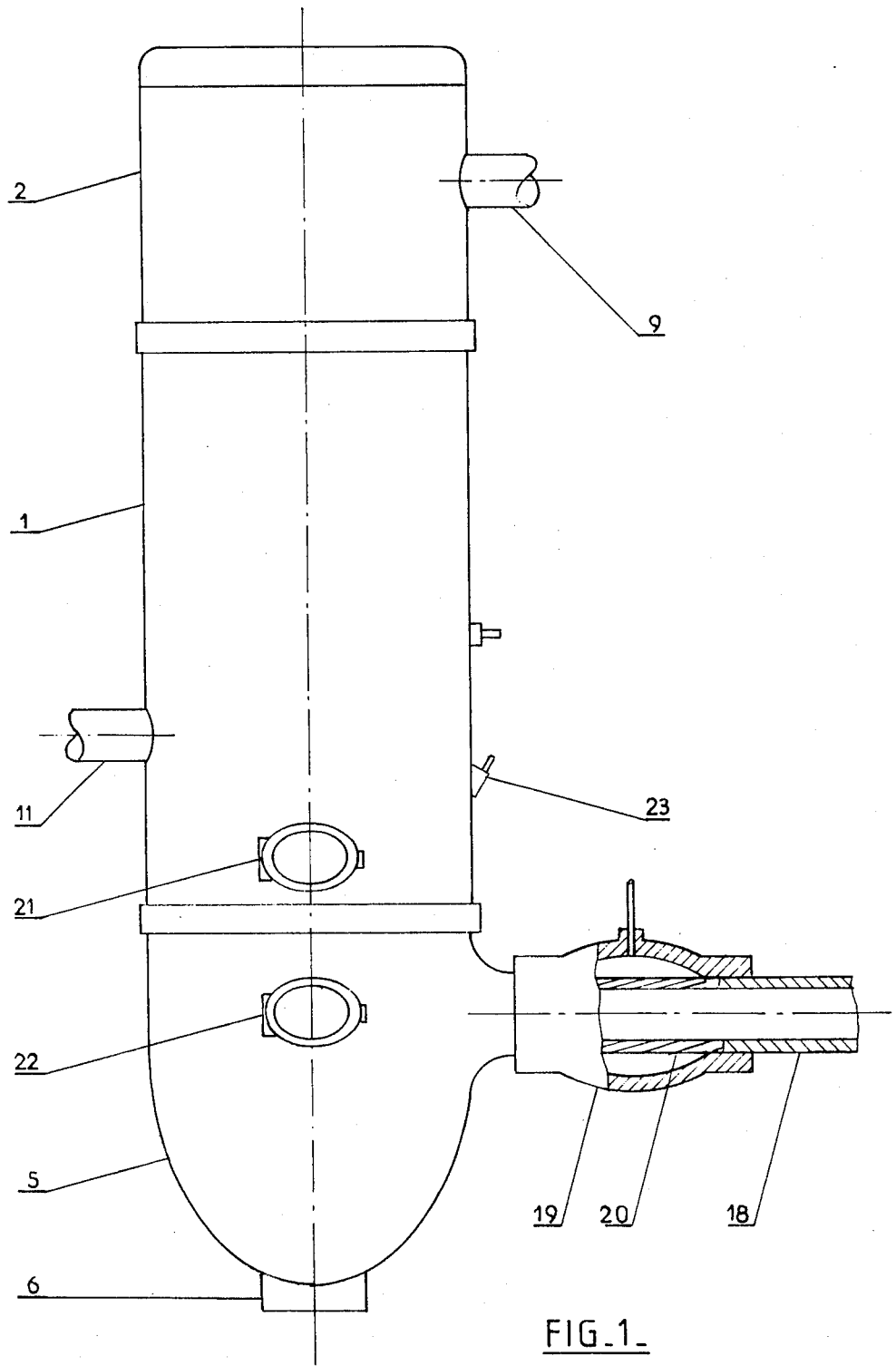
FIG. 1 is a front elevation of an installation according to the invention.
Figure 2:
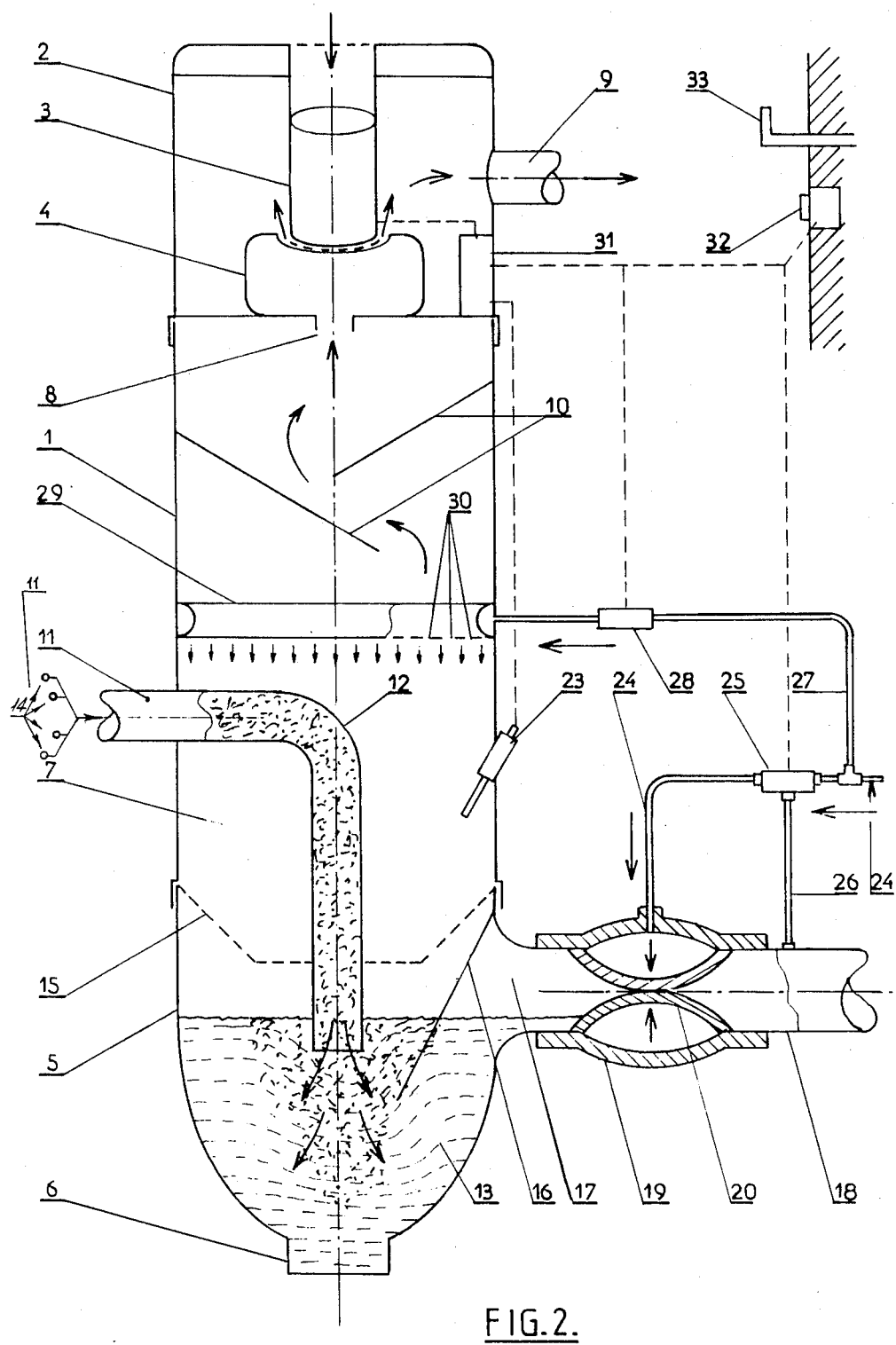
FIG. 2 is a view of a vertical axial section of the installation of FIG. 1.

The installation shown schematically in FIGS. 1 and 2 comprises an essentially cylindrical dust removal unit containing a hollow center body 1, surmounted by a casing 2 enclosing the motor 3-turbine 4 assembly and being joined at its lower part to a bowl 5 with a semispherical end closed by a drain plug 6.

The integral body 1 defines a closed enclosure 7 communicating at its upper part with the suction orifice 8 of the turbine 4, with cleaned air exhausting through a conduit 9.

Dust deflection baffles 10 are placed in the top part of enclosure 7.

Dust-containing air is introduced into body 1 through duct 11 equipped with an angled conduit opening into water reservoir 13 provided in bowl 5.

The duct 11 is connected, in a known manner, with a network of ducts 11A ending in a certain number of suction orifices distributed over different locations or parts, each being equipped with an incorporated microcontact 14 connected with the electrical control circuits of the installation.

A grate 15 is placed over water reservoir 13 and a baffle 16 is mounted upstream of fluid outlet means 17, with said outlet means communicating with a drain 18 for the drainage of waste water. Valve 19 may contain a flexible sealing sleeve means 20.

The body 1 (FIG. 1) is equipped at its lower part with view and access port 21 opening above the grate 15, while the bowl 5 is also provided with a view and access part 22 opening just under the grate 15 and above the level of the water reservoir 13, i.e., the lower end of the drain 18.

A sensor 23 acting as a safety level is mounted in the enclosure 7 essentially half-way between the duct 11 and the grate 15.

The control fluid of the valve 19 is water under pressure originating for example in the municipal water distribution system and supplied through a line 24 into which a three-way solenoid valve 25 is placed. The third way ends in line 26 connected to drain 18 downstream from the valve 19.

The network of water under pressure is also connected by a line 27 with a two-way solenoid valve 28 supplying a circular conduit 29 perforated by holes 30 and placed inside the enclosure 7, between the baffles 10 and the duct 11.

The solenoid valves 25 and 28 are connected electrically with an electronic control box 31. The control box 31 also joins motor 3, sensor 23, and push-button 32. Button 32 should be placed somewhere convenient for the control of the installation, for example, in the vicinity of a hook 33. This hook serves to hang mobile elements of the installation (rods, flexible hose, suction dredgers) when the latter are not in service.

Figure 3:
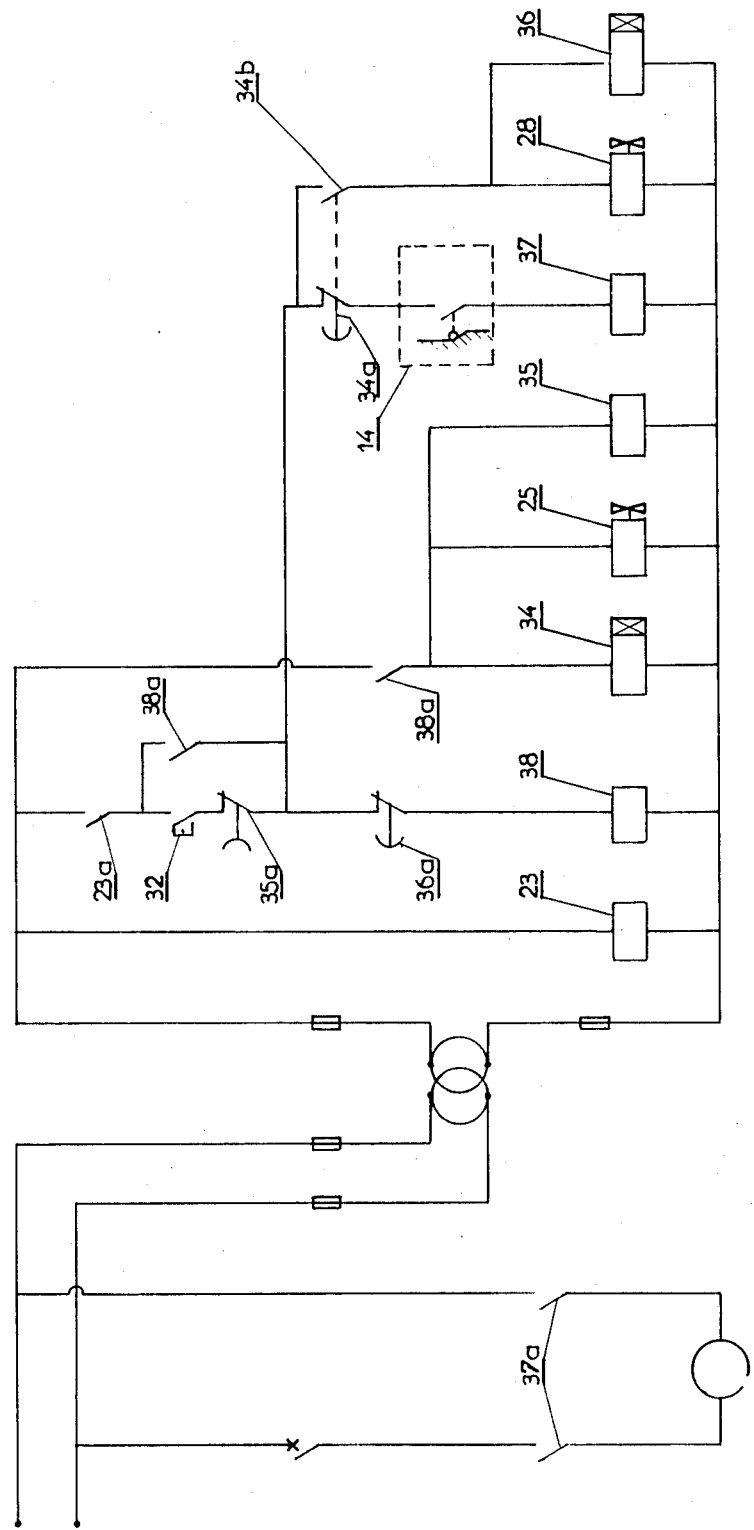
FIG. 3 shows the electric circuit diagram of the installation.

FIG. 3 depicts the electric circuit diagram of the vacuum system. Time-delay relay 34 (with its contacts 34a, 34b) operates to control valve 19 by means of solenoid valve 25. A time-delay release relay 35 (with its contact 35a) controls the closing of valve 19 also by solenoid valve 25. Time-delay relay 36 (with its contact 26a) closes solenoid valve 28. A control relay 37 actuates motor 3 by its contact 37a. Contact 23a is opened by the sensor 23 if the level of water in the enclosure 7 reaches the electrode of said sensor, and at 38 a locking relay (with its contact 38a) are shown.

If the means necessary for cleaning are taken from the hook 33, and pressure is applied to the push-button 32, relay 38 activates. The contacts 38a close, the relays 34 and 35 are actuated, together with the solenoid valve 25, which closes the valve 19.

The actuation of the relay 34 closes contact 34a which will open, for example, 1 hour 30 minutes later. Contact 34b opens when contact 34a closes.

Relay 38 activates the installation but motor 3 does not yet start because its power supply is controlled by contacts 37a which are activated by relay 37. Relay 37 is actuated only when one of the micro-contacts 14 of the installation is closed by placing the suction device into one of the above-mentioned suction orifices.

After some time of operation, e.g., 1 hour and 30 minutes, contact 34a opens and contact 34b closes. When this occurs, the power supply to motor 3 is interrupted and the filling of water into enclosure 7 is started by solenoid valve 28 and time delay relay 36 (time-delayed, for example, by 90 seconds) is actuated.

After the time delay for filling, if enclosure 7 is not filled to sensor 23 or sensor 23 is malfunctioning, contact 36a opens, relay 38 is deactivated and contact 38a opens. The solenoid valve 28 is reset into its initial position (filling discontinued) and valve 19 is placed into its open position (by solenoid valve 25). On the other hand, if enclosure 7 is filled to sensor 23 before the filling time has elapsed, sensor 23 opens contact 23a which has the effects of the sequence set forth above when sensor 38a opens.

When valve 19 opens, the weight of the water accumulated in enclosure 7 produces a flushing effect, flushing out the dust and other debris collected in the bowl 5.

If the operator wants to start a new cycle, it suffices to depress the push-button 32.

The grate 15 is to retain solids in the bowl 5 and to provide a better dispersion of the dust as well as breaking and pulverizing water drops.

Furthermore, the placement of the motor 3-turbine 4 assembly above the body 1 permits an appreciable reduction of the size of the installation.

Finally, the invention is obviously not limited to the mode of embodiment shown and described above, but also covers all of its variants.

I claim:

1. A central vacuum cleaning system comprising:
   (a) permanent ducts with suction orifices and located in a building;
   (b) a vacuum apparatus in fluid communication with said permanent ducts and comprising:
      (1) a central suction means for producing suction in said permanent ducts;
      (2) means for removing dust from air drawn into said permanent ducts;
      (3) means comprising a perforated annular conduit within said vacuum apparatus;
      (4) fluid outlet means comprising fluid outlet valve means; and
   (c) means to generate a flushing effect within said vacuum apparatus:
      (1) a three-way valve in communication between said fluid outlet valve means and a pressurized source of water;
      (2) a two-way valve in parallel to said threeway valve and in communication between said perforated annular conduit and said pressurized source of water; and
      (3) time control means for said valves for actuating a cycle of operation comprising closing said fluid outlet valve means, passing water through said perforated annular conduit for a predetermined time period, and opening said fluid outlet valve means.

2. A central vacuum cleaning system as in claim 1 wherein said vacuum apparatus comprises an integral body.

3. A central vacuum cleaning system as in claim 1 further comprising a water reservoir having a water level within the vacuum apparatus.

4. A central vacuum cleaning system as in claim 3 wherein said means for removing dust from air drawn into said ducts comprises an angled inlet conduit which terminates beneath said water level.

5. A central vacuum cleaning system as in claim 4 further comprising a baffle upstream of said fluid outlet means.

6. A central vacuum cleaning system as in claim 3 further comprising a grate above said water level.

7. A central vacuum cleaning system as in claim 6 further comprising viewing and access ports on either side of said grate.

8. A central vacuum cleaning system as in claim 3 wherein said water level is substantially equal to an opening height of said fluid outlet means.

9. A central vacuum cleaning system as in claim 1 wherein said fluid outlet valve means comprises a flexible sleeve valve.

10. A central vacuum cleaning system as in claim 1 wherein said control means further comprises a water level sensor.

* * * * *